2 Sheets—Sheet 1.
A. G. OSGOOD.
Stone-Sawing Machine.
No. 223,164. Patented Dec. 30, 1879.
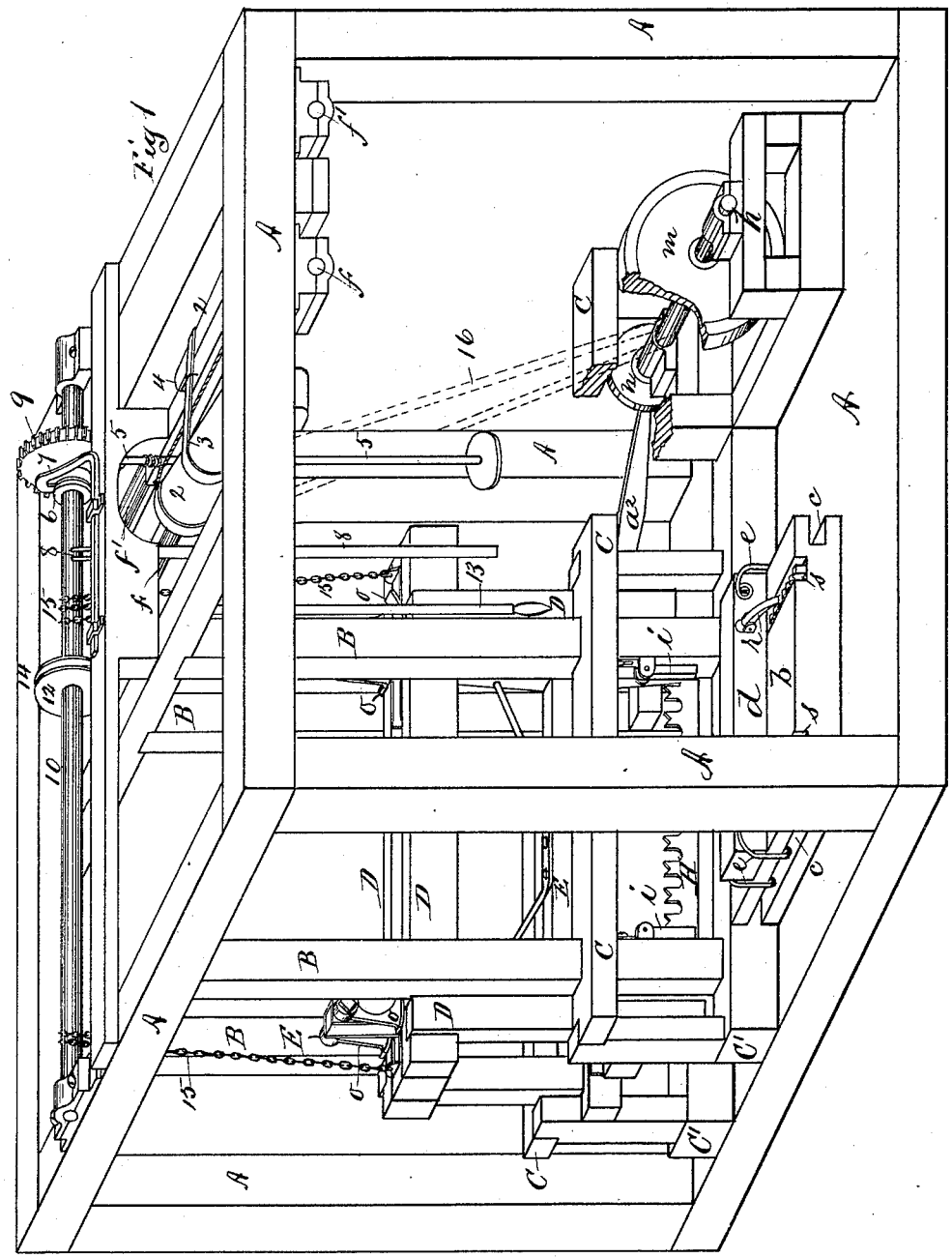
Witnesses
Wm H Chapin
Edward E. Bill.
Inventor
Alfred G. Osgood
By Henry A Chapin
Atty 2 Sheets—Sheet 2.
A. G. OSGOOD.
Stone-Sawing Machine.
No. 223,164.          Patented Dec. 30, 1879.
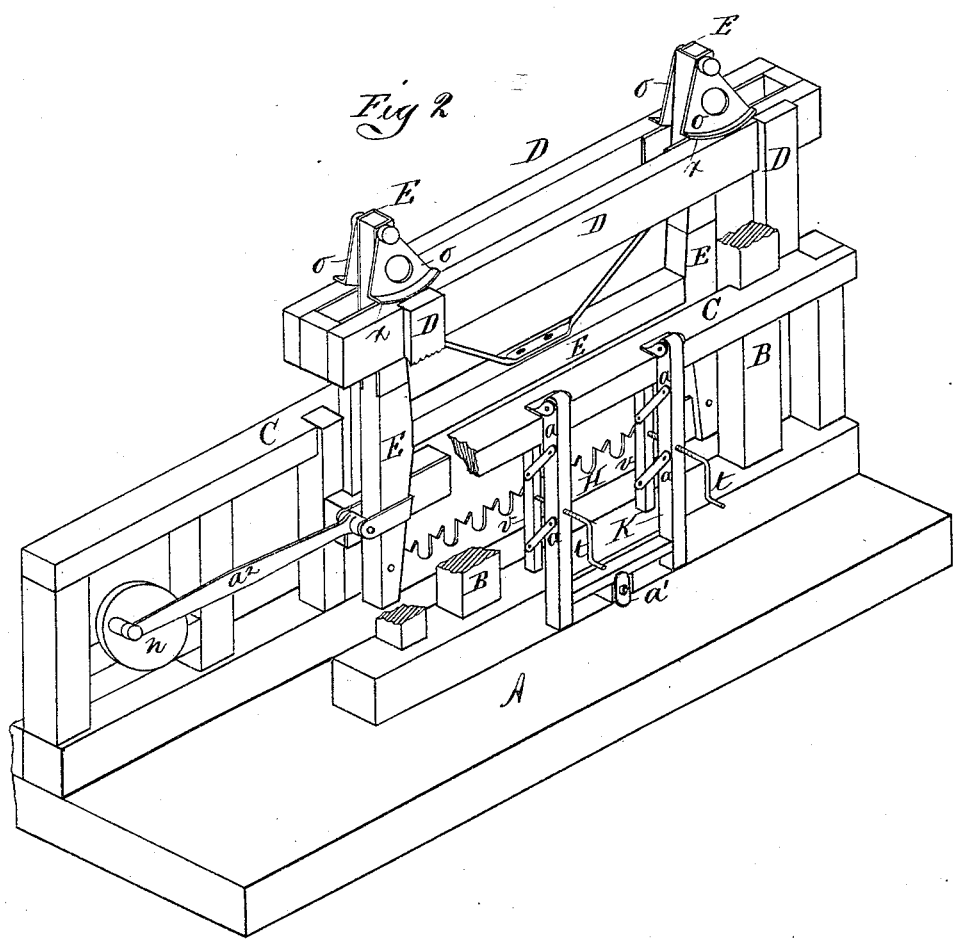

UNITED STATES PATENT OFFICE.

ALFRED G. OSGOOD, OF SPRINGFIELD, ASSIGNOR TO WILLIAM B. KIMBALL, OF ENFIELD, MASSACHUSETTS.

IMPROVEMENT IN STONE-SAWING MACHINES.

Specification forming part of Letters Patent No. 223,164, dated December 30, 1879; application filed November 17, 1879.

*To all whom it may concern:*

Be it known that I, ALFRED G. OSGOOD, of Springfield, county of Hampden, and State of Massachusetts, have invented new and useful Improvements in Machines for Sawing Stone, which improvements are fully set forth in the annexed specification and in the accompanying drawings.

My invention relates to that class of sawing-machines which are used for sawing soapstone and other stone of similar nature; and it consists of a properly-constructed saw secured to a frame arranged to have the usual vertical and reciprocating motions, and to be fed upward against the stone, so as to saw from the under side upward, and having arranged to be operated with said saw requisite feeding devices to feed the saw against the stone and clamping devices for holding the stone over the saw.

Referring to the drawings, which consist of two figures, Figure 1 is an isometrical elevation of my machine. Fig. 2 is a like view of the saw-frame and its carriage, with the main frame removed, showing parts of the machine on the side opposite to that shown in Fig. 1.

In the drawings, A is the main frame of the machine. B are vertical ways between which the saw-frame carriage moves up and down. C is a horizontal frame constructed outside of ways B, to strengthen the latter. D is the saw-frame carriage. E is the saw-frame. H is the saw. $o$ are segments of friction-rolls supporting the saw-frame. $b$ is a clamp-bar bed. $c$ are transverse grooves, one across each end of bed $b$. $d$ is a clamp-rail on bed $b$, provided with hooks $e$ on each end. $i$ are hinged braces on ways B. $r$ are dogs pivoted to rail $d$. $s$ is one of two serrated bars fixed in the top of bed $b$. K is a clamp-frame hinged to frame C. $t\,t$ are clamp-screws. $v$ are vertical clamp-bars pivoted to frame K by parallel straps $a$. $a'$ is a button to fasten frame K down. $h$ is a shaft provided with a driving-pulley, $m$, and a crank-plate, $n$. $a^2$ is a pitman-rod connected to the saw-frame and to crank-plate $n$. $f\,f'$ are two feed-shafts hung in frame A, under and at right angles to shaft 10. 2 2 are two cone-pulleys on shafts $f\,f'$. 3 is a belt running on pulleys 2. 4 is a belt-shipper. 5 is a rotating belt-shipper rod. 6 is a clutch fitted on a spline in shaft 10. 7 is a clutch-shipper. 8 is a shipper-rod. 9 is a worm-gear turning loosely on shaft 10. 12 is a friction-pulley. 13 is a brake-rod. 14 is a friction-strap running over pulley 12. 15 are suspending-chains. 16 is a belt from shaft $h$ to shaft $f$.

Heretofore it has been the practice to construct stone-sawing machines to operate to cut downward upon the stone. In so operating such saws the accumulation of pulverized gritty matter in the saw-track causes the saw to run hard, requiring much power to operate it, and the teeth in it to be soon worn out, and saws arranged to be so operated must be run at a comparatively low rate of speed.

To obviate the aforesaid objections and provide an improved stone-sawing machine I construct my machine so that the saw is fed upward against the bottom of the stone, while a reciprocating motion is given to it, and thus the gritty matter disengaged from the stone by the action of the saw is left free to drop away from the stone, keeping the saw-track clean and unobstructed, so that the saw can be easily and rapidly worked against the stone.

I construct my saw-frame of two uprights and a cross-bar, E, and braced as shown, and between the bottom ends of the said uprights I secure the saw so that its teeth project upward, leaving a space between said teeth and said cross-bar, as shown.

The upright end pieces of the saw-frame have pivoted on the sides, at the top thereof, the segments of friction-rolls $o$.

The saw-frame and saw are arranged to be suspended in a carriage, D, which consists of a frame constructed with two horizontal bars for the top and two vertical posts for each of the ends, one of said bars and two of said posts being framed together to form one side of the carriage, and the two sides so formed are blocked apart, as shown, to permit the saw-frame to be suspended between them, with the circular faces of segments $o$ bearing upon the top of said horizontal bars of the carriage. To one end of each of said segments $o$ is attached a metallic strap, $x$, and lying between the face of the segment and the top of the rail of carriage D, and having one end attached to said rail, said strap serves as a flexible track for the segment to roll upon, and to keep the saw-frame in a proper position in carriage D. Thus hung, the saw-frame has a free longitudinal motion between the sides of the carriage, swinging on said segments.

The carriage is arranged to be moved up and down between the vertical ways B, and to carry the saw-frame with it.

Arranged to be revolved by a worm-gear, 9, made with a clutch-hub, is a shaft, 10, fixed on frame A over the carriage D, and chains 15 are attached to said carriage and secured to shaft 10, so that upon winding said chains thereon carriage D will be lifted up, and vice versa.

Under the said worm-gear 9, upon shaft $f'$, is fixed a worm arranged to engage with gear 9. Upon shaft $f'$, and upon shaft $f$, lying parallel therewith in frame A, are fixed two cone-pulleys, 2 2, connected by a belt, 3, and having a belt-shipper, 4, arranged to be operated by rod 5 and a cord, as shown. Shaft $f$ is arranged to be driven by a belt, 16, as shown, by shaft $h$.

Fitted on a spline on shaft 10, by the side of the clutch-hub of gear 9, is a clutch, 6, arranged to be operated on the top of frame A, as seen, by a lever, 8, pivoted thereon.

A friction-pulley, 12, is fixed on shaft 10, around which a friction-strap, 14, is fitted, and the latter is connected with the end of a rod, 13, so pivoted to frame A that said friction-strap can be made to bind on pulley 12 by swinging the end of said rod.

A shaft, $h$, is hung near the base of frame A, having a driving-pulley, $m$, thereon, and carrying on one end a crank-plate, $n$. A pitman-rod, $a^2$, is connected to said crank-plate and to the saw-frame E.

On one side of frame C is placed a clamp-bar bed, $b$, having a clamp-bar, $d$, arranged to move thereon toward and from the saw, and to be held down against said bed by the hooks $e$, secured to said bar, and engaging in grooves $c$ in the ends of bed $b$.

On bar $d$ are pivoted two dogs, $r$, arranged to engage in two serrated bars, $s$, set in said bed at right angles to and under said bar. Two braces, $i$, are hinged to ways B, as shown.

The operation of my machine is as follows: The carriage D, with the saw-frame, which hangs by chains 15 on shaft 10, guided vertically between the ways B, is lowered down so that the points of the saw-teeth are below the level of the clamp-bed $b$, Fig. 1. This is done by operating lever 13 to cause the friction-strap 14 to grasp the friction-pulley 12 and prevent shaft 10 from revolving. Then clutch 7 is by lever 8 disengaged from the hub of gear 9, and the friction-strap 14 being now slightly freed from pulley 12, the weight of the carriage and saw-frame will cause them to drop down to the said position. The stone to be sawed is next placed on bed $b$, lying from thence across the tops of the bottom rails, C', and over the saw, which has been lowered down between said bottom rails. One edge of the stone will thus be next to clamp-rail $d$, and its opposite edge next to the vertical clamp-bars $v$, Fig. 2. The width of the piece to be sawed from the stone is gaged by adjusting said vertical clamp-bars so that their distance from the saw is equal to the said width of the piece to be sawed, and screws $t$ are turned up against said bars to retain them in their proper position. The stone is now moved up against said bars $v$, and clamp-rail $d$ is forced against it. Dogs $r$ are caused to engage in the rails $s$, and the hinged braces $i$ are arranged to bear against the top of the stone. Thus it is held firmly over the saw. Shaft $h$ is now set in motion, causing the saw-frame to be moved reciprocally in carriage D, the saw being under the stone, and shafts $f f'$ to be revolved. Clutch 6 is caused to engage with the revolving worm-gear 9 by operating shipper-rod 8, causing shaft 10 to revolve slowly, and, winding chains 15 around it, to draw carriage D, in which the saw-frame is hung, upward, and cause the teeth of the saw to be forced against the bottom surface of the stone.

The frame K, Fig. 2, is hinged to frame C, so that it can be lifted up from before the saw to permit of easily putting a stone in place on the frame.

The speed of the upward feed of the saw is regulated by the position of belt 3 on the cone-pulleys 2, and said belt is controlled by a vertical rod, 5, arranged to wind upon it a cord attached to the shipper 4, as shown in Fig. 1.

Thus the combined reciprocating and upward motions of the saw will be continued against the stone until the sawing is completed. Meanwhile the portion of the stone cut away by the saw falls freely away from the latter beneath the stone, and causes no obstruction to the free operation of the saw.

It is obvious that more than one saw may be so operated in one frame by providing a requisite arrangement for supporting the pieces of the stone between the saws.

What I claim as my invention is—

1. In a machine for sawing stone, the carriage D, having suspended within it the saw-frame and the saw with its teeth on its upper edge, and arranged to be moved vertically, by mechanism substantially as shown, while the saw-frame is operated reciprocally in the carriage, substantially as and for the purpose set forth.

2. In combination with the carriage D, and with the saw-frame, having the saw with its teeth pointing upward secured to it, the shaft 10 and chains 15, to lift up the carriage, substantially as and for the purpose set forth.

3. The combination, with shaft 10, arranged to lift the carriage by chains 15, of mechanism, substantially as shown and described, for revolving said shaft at varying speeds, substantially as and for the purpose set forth.

4. The combination, with the saw arranged to be operated against the bottom of a stone to saw it, of the clamp-bar $d$, provided with dogs $r$ and hooks $e$, the vertical clamp-bars $v$, pivoted to the frame K, and the screws $t\ t$, substantially as and for the purpose described.

5. The frame K, hinged to frame C, and provided with the clamp-bars $v$, pivoted thereto, and the screws $t\ t$, substantially as and for the purpose set forth.

6. The segments $o$, pivoted on the saw-frame, and having the flexible metallic straps $x$ secured to said segments and to the carriage D, substantially as and for the purpose set forth.

7. The hereinbefore-described improvement in the art of sawing stone, which consists in causing the saw to operate vertically and with a reciprocating motion against the under side of the stone, substantially as set forth.

ALFRED G. OSGOOD.

Witnesses:
HENRY A. CHAPIN,
WM. H. CHAPIN.